Jan. 30, 1968   C. R. FORE   3,366,132
ELECTRICALLY ACTUATED HYDRAULIC SERVOVALVE AND TORQUE MOTOR
Filed Oct. 24, 1965                                3 Sheets-Sheet 1

INVENTOR.
CHARLES R. FORE
BY
Robert E. Shauss
ATTORNEY

Jan. 30, 1968            C. R. FORE            3,366,132
ELECTRICALLY ACTUATED HYDRAULIC SERVOVALVE AND TORQUE MOTOR
Filed Oct. 24, 1965            3 Sheets-Sheet 2

INVENTOR.
CHARLES R. FORE
BY
*Robert Shaws*
ATTORNEY

3,366,132
ELECTRICALLY ACTUATED HYDRAULIC SERVOVALVE AND TORQUE MOTOR
Charles R. Fore, 3421 California,
Long Beach, Calif. 90807
Filed Oct. 24, 1965, Ser. No. 504,743
10 Claims. (Cl. 137—82)

This invention relates to an improved electrically actuated hydraulic servovalve which differentially controls the output hydraulic pressure of hydraulic lines and to an improved electrically actuated torque motor useful in combination with the servovalve.

The electrically actuated hydraulic servovalves generally have a flow divider such as a slide, vane or ball that is mechanically coupled to an electrical torque motor so that the flow through parallel control lines is divided by actuation of the motor which moves the flow divider to open or to close a port in the control lines. In other embodiments, the servovalves have bypass lines from the control lines and a flow modulating element moved between discharge ports of the bypass lines to control the amount of fluid diversion through these lines, thereby controlling the fluid pressure and flow in the control lines.

Electrically actuated torque motors are used with the aforementioned servovalves. These motors generally comprise a pivotable armature which is surrounded by a coil and the assembly of coil and armature is positioned in the field of a permanent magnet. Passage of current through the coil induces a magnetic field in the armature and causes it to deflect in the magnetic field of the permanent magnet. Heretofore, these motors have been assembled from permanent magnets and ferromagnetic walls having pole pieces contiguous thereto which provide a flux path for the magnetic field of the permanent magnet.

Commonly, the assembly of permanent magnets and pole pieces is retained with conventional fasteners such as machine screws that are passed through holes bored in the ferromagnetic material or in the permanent magnets. The perforations in these materials necessary for the conventional fabrication of the housing of the motor interrupts the continuity of the flux path and considerably weakens the strength of the magnetic field at the pole interface with the armature. Additionally, the use of fasteners such as machine screws imparts localized stresses on the ferromagnetic material which interferes with the magnetic fields through this material. The interruption of the flux path and the localized stresses imposed on the housing weakens the magnetic flux density at the poles and thereby lowers the power output of the torque motors and this requires the use of either cumbersomely large motors or weaker components in the valve system which do not provide the desired performance.

A specific embodiment to which the torque motor of my invention is directed comprises a servovalve useful in hydraulic systems. In this operation the armature of the motor is fastened to the valve housing with a resilient hinge means, typically a torsion bar, that flexes sufficiently to permit a flapper attached thereto to move between right and left control ports and thereby control the shunting of the hydraulic fluid in the system. The electrically actuated torque motors employed heretofore have required the use of a fairly flexible torsion bar which, when employed with high pressure hydraulic systems, often reaches resonance and malfunctions by fluttering into and out of engagement with the shunt ports.

It is an object of this invention to provide an improved electrically actuated hydraulic servovalve.

It is a further object of this invention to provide an electrically actuated hydraulic servovalve for high temperature service.

It is also an object of my invention to provide an electrically actuated torque motor having an improved efficiency and power output.

It is an additional object of my invention to provide an electrically actuated torque motor having an improved permanent magnet and ferromagnetic material housing.

It is a further object of my invention to provide an improved servovalve for hydraulic systems utilizing the improved electrically actuated torque motor of my invention.

Other and related objects will be apparent from the following description of my invention.

My invention will now be described by references to the figures of which:

Figure 1:
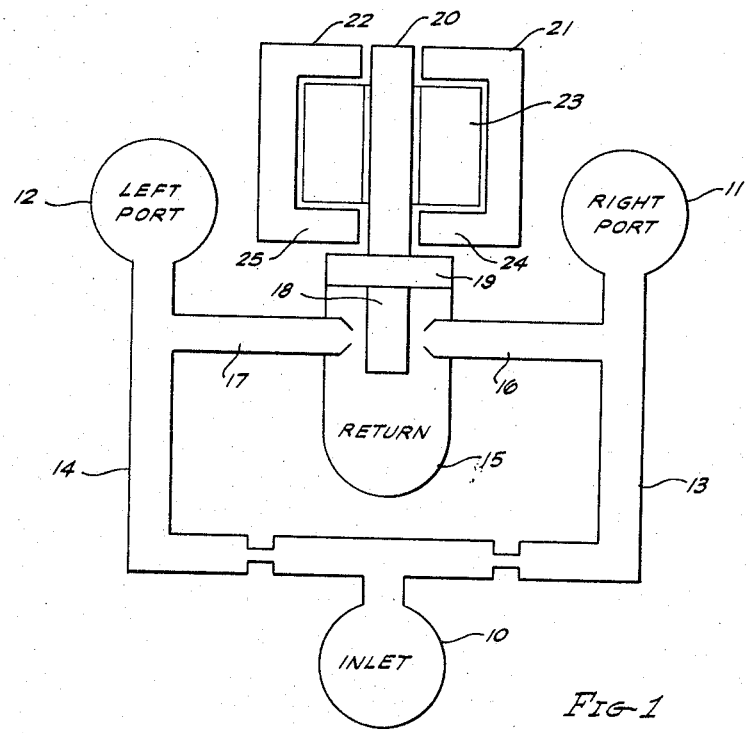
FIGURE 1 is a schematic of the hydraulic system of the servovalve according to my invention.

FIGURE 1 illustrates the schematic flow through the servovalve of my invention. The inlet from the hydraulic system is shown at 10 through which the hydraulic fluid enters under suitable pressure and divides into branch lines 13 and 14 to right port 11 and left port 12, respectively, to actuate the right and left hydraulically controlled elements. Shunt lines are provided as shown at 16 and 17 from branch lines 13 and 14, respectively, which divert a portion of the flow from the branch lines to return 15. The amount of flow going to either the right or left port is thus controlled by the amount of diversion of flow that occurs in the shunt lines. The shunt lines are ported in opposed relationship and a port closure means such as flapper 18 is supported between these ports by a resilient spring hinge means such as torsion bar 19. Flapper 18 is caused to move to the right or left, thereby curbing the flow from the ports of the right or left shunt lines, respectively, by the torque motor.

The torque motor is illustrated as comprising armature 20 which is rigidly secured to valve flapper 18 and torsion bar 19. A coil 23 is positioned around armature 20 and surrounded by ferromagnetic walls 21, 22, 24 and 25 which is contiguously with permanent magnet sidewalls hereafter described in greater detail. The passage of current through coil 23 induces a magnetic field in armature 20 causing it to deflect in the permanent magnet field passing through the ferromagnetic walls and integral poles 21, 22, 24 and 25. This deflection in turn flexes torsion bar 19 and deflects valve flapper 18, thereby increasing or decreasing the hydraulic fluid shunting through shunt lines 16 or 17.

Figure 2:
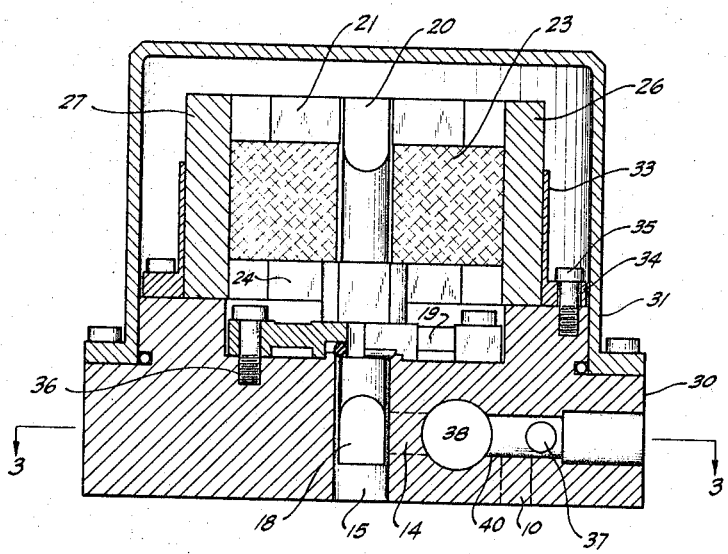
FIGURE 2 is an elevation cross-section through the assembly of the improved torque motor and servovalve of my invention.

FIGURE 2 illustrates the motor armature and valve member of my invention as it is applied to the aforementioned hydraulic servovalve. This device comprises a valve body 30 fitted with a cover cup 31. Coil 23 is shown surrounding armature 20 which is affixed to metal plate 19 which serves as the flexible hinge member. One pole of the motor is shown to the rear of FIGURE 2 as element 22 and its companion lower pole 25 is also shown. The permanent magnets that form contiguous sidewalls with the ferromagnetic material walls are shown in cross-section as elements 26 and 27. In the embodiment illustrated in my invention, the permanent magnets and ferromagnetic material walls comprise a circular housing surrounding the coil and armature. It is apparent that other geometrical shapes are useful without departing from the scope of the invention; however, the circular shaped housing is preferred. In this embodiment, the permanent magnets are circular arcs having a thickness shown in the cross-section of this view.

The entire assembly of coil, permanent magnet and ferromagnetic material sidewalls is surrounded by suitable retaining means such as sleeve 33 into which the assembly is press fitted. Sleeve 33 has a lower flange 34 through which machine screws 35 can be employed for mounting the motor housing on a suitable base plate such as valve body 30.

The hinge member 19 is also fastened to the valve body 30 by similar machine screws 36. The valve flapper 18 extends into a bore in the valve body which comprises the return line 15 for the hydraulic system. The inlet to the valve body 30 is shown as port 10 in hidden object lines which communicates with a passageway 37 that supplies the hydraulic fluid to filter chamber 38 from where the hydraulic fluid flows, on opposite sides, to the lines 13 and 14; see passageway 14 shown in hidden object lines in the cross-sectional view.

Figure 3:
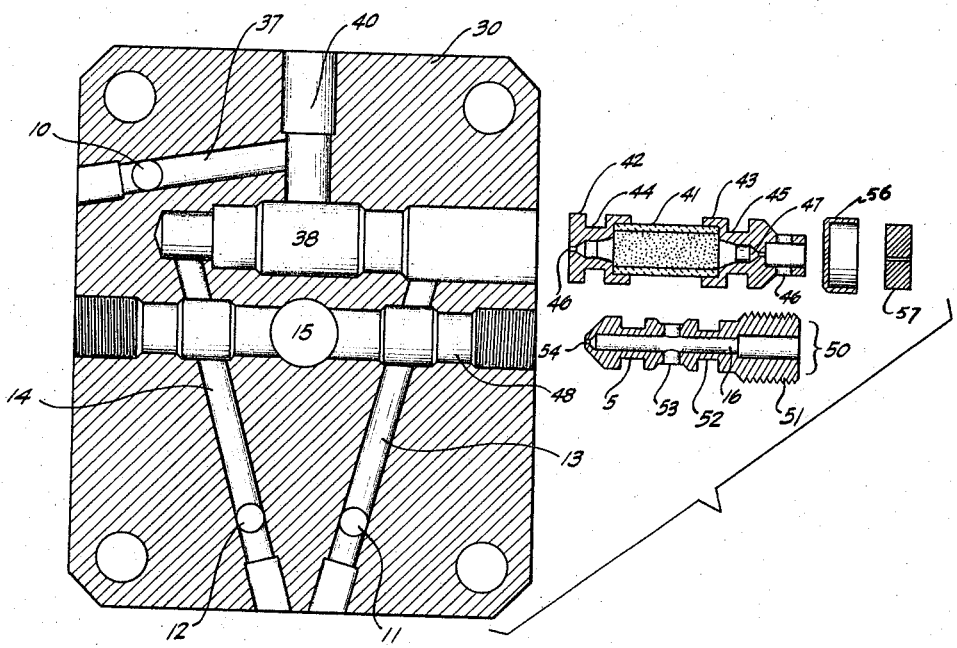
FIGURE 3 is a cross-section along lines 3–3' of FIGURE 2.

FIGURE 3 illustrates a view taken along line 3–3' of FIGURE 2. A feature of my invention in the valve construction is apparent from FIGURE 3 which is the complete symmetry of the fluid passageways from inlet passageway 40 through the remainder of valve body 30 which insures that the deflection of flapper 18 of the valve in either direction will create equal fluid pressure and flow changes. The components of the valve assembly have been removed and are shown to the right of this figure. The valve body 30 is bored with fluid passageways which comprise inlet port 10 that intersects bore 37 for directing hydraulic fluid to passageway 40 and into filter chamber 38. The filter assembly, shown to the right of the FIGURE 3, comprises filter 41 which is formed of sintered metal powders, e.g., stainless steel powders, that is fitted with spools 42 and 43 having circumferential grooves 44 and 45 for retention of O-rings. The spools are bored at 46 and 47 to provide fluid passageways from the interior of the sintered metal cylinder 41. Passageway 46 communicates with bore 14 which leads to the left outlet port 12 while passageway 45 communicates through port 46 to passageway 13 leading to the outlet right port 11.

The shunt lines illustrated as 16 and 17 in FIGURE 3 have the form of longitudinal bores through the interior of valve adjustment members such as 50 that fit on each side of the tapped bores 48 in body 30. These members have a threaded outboard shank 51 and an O-ring seat as a circumferential groove 52. The member 50 is bored at 53 to permit passage of fluid through the branch lines 13 and 14 to the outlet ports 11 and 12. A second O-ring seat 55 is provided and the member 50 terminates in a sharp-edged port 54 which, when the member is threaded into the valve body, extends into chamber 15 opposed to the flat face of valve flapper 18 which can flex between closed and open registration with this port. Precise adjustment of the separation of port 54 from flapper 18 can be achieved by advancing or retracting threaded member 50 in tapped bore 48.

All outlet and inlet ports are shown in the undersurface of body 30 and the bores through the outside edges of body 30 are sealed with lead plugs such as cylindrical cap 56 which is fitted into the bore and locked therein by driving plug 57 into the cap.

Figure 4:
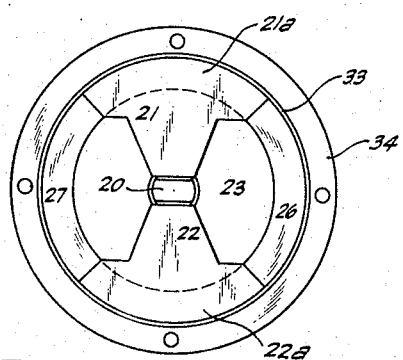
FIGURE 4 is a plan view of the torque motor assembly of my invention.

As previously mentioned, my invention comprises an improved electrically actuated torque motor as well as the combination of the motor with a servovalve. The motor is illustrated in further detail in FIGURE 4. In FIGURE 4 the retaining member 33 is shown as a band about the periphery of the motor with a lower flange 34. Coil 23 is shown in the motor housing and the upper end of armature 20 is shown spaced between the upper poles 21 and 22. Permanent magnet sidewalls 26 and 27 are illustrated in mating and contiguous engagement with the sidewalls of the magnetically permeable, i.e., ferromagnetic, material used for the remainder of the housing and the poles.

It is apparent from FIGURE 2 and FIGURE 4 that electrically actuated torque motor of my invention thus comprises magnet sidewalls such as 26 and 27 which mate with the contiguous sidewalls 21a and 22a of a ferromagnetic material. It is likewise apparent that the relative ratios of the mass of permanent magnet to the mass of ferromagnetic material can be varied over extremely wide ratios to permit the fabrication of torque motors having a wide variety of efficiency or power gain. This ratio can be varied simply by increasing the length of the permanent magnet sidewalls 26 and 27 from quarter chords as illustrated in FIGURE 4 until these sidewalls approach the length of half chords or semi-circles. In this embodiment the permanent magnets would approach each other at the intersection with the ferromagnetic material; however, a suitable thickness, e.g., at least about several millimeters of wall thickness, would be maintained to separate the permanent magnet sidewalls. The range of this ratio of the permanent magnet mass to the mass of ferromagnetic material, i.e., the ratio of the sum of mass 27 plus 26 to the sum of the mass 21a and 22a, can be widely varied from 5:95 to about 99:1. Preferably this ratio is from about 20:80 to about 80:20 and most preferably from about 35:65 to about 65:35. As illustrated, the ratio in FIGURE 4 is 50:50.

Figure 5:
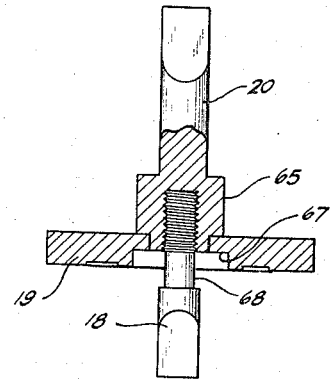
FIGURE 5 is a cross-section through an armature employed in my invention.
Figure 6:
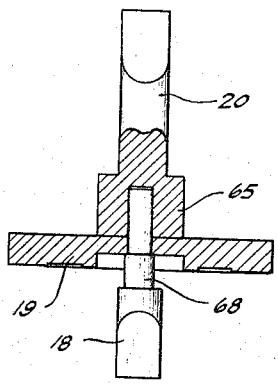
FIGURE 6 is a cross-section of a second armature useful in my invention.
Figure 7:
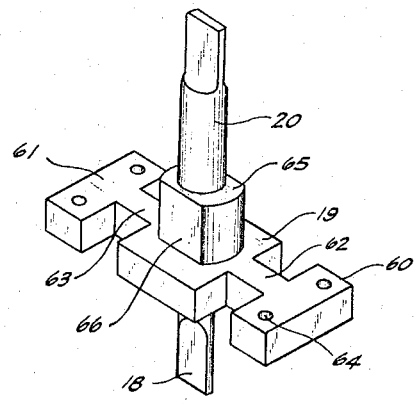
FIGURE 7 is an illustration of the armature and hinge assembly used in my torque motor and valve assembly.

Referring now to FIGURES 5 through 7, the armature hinge and valve assembly of my invention is illustrated in greater detail. FIGURES 5 and 6 are cross-sectional views of alternate methods of construction of this device and FIGURE 7 is an isometric view of the entire assembly. FIGURE 7 illustrates the torsion bar 19 to comprise outboard wings 60 and 61 which are connected to the main hinge body by necks 62 and 63. The outboard wings are bored as shown at 64 for screws 36, shown in FIGURE 2, which secure the torsion bar on base plate 30. Armature 20 is secured to the base plate with an enlarged shank 65 and valve flapper 18 is secured to the underside of the torsion bar. Shank 65 is segmented as shown to provide opposite faces 66 which are arranged in parallel position to the flat faces 70 of the upper end of armature 20. Faces 66 and 70 are mounted between the lower opposed poles 24 and 25 and upper opposed poles 21 and 22, respectively. These faces and the flat faces of flapper 18 are machined after fabrication to insure that they are parallel to each other.

The details of one construction of the assembly are shown in FIGURE 5. In this embodiment the torsion bar 19 has a central bore into which extends a shoulder on the under side of shank 65 of armature 20. The shank 65 is tapped as shown and valve flapper 18 has a screw shank which is threaded into the tap of 65. The under side of bar 19 is routed with a circular seat 67 for an O-ring which surrounds the shank 68 of valve flapper 18. To provide positive seating against the under surface of 65, shank 68 is of slightly larger diameter than the threaded portion that extends into the tap in member 65. Also valve flapper 18 is of slightly larger diameter than shank 68 to provide a shoulder for retaining the O-ring.

FIGURE 6 illustrates an alternative construction of the assembly of armature, hinge and valve flapper. In this construction the shank 65 of armature 20 has a flat under surface with a central bore. Valve flapper 18 is press fitted into the central bore in the under surface of 65, passing through a similar central bore in bar 19. The hinge member is routed to provide an O-ring seat in a similar manner to that previously described in regard to FIGURE 5.

The armature is constructed of suitable magnetically permeable material such as alloys of iron with nickel, molybdenum and/or cobalt. Typical of such alloys are Permalloy and Conpernick. Preferably, alloys having high magnetic permeabilities and almost square hysteresis loops are employed for this construction. The torsion bar 19 is constructed of a suitably flexible material such as copper, although nickel steels can be used for high temperature applications. The flapper 18 is constructed of a suitable corrosion and wear resistant metal, e.g., stainless steel. To provide maximum strength and flexibility of the copper bar 19, this member is heat-treated at about 500° F. for 6 hours. The entire assemblies of FIGURES 5 and 6 can be cemented together by tin plating, i.e., by coating the mating surfaces of the components with a tin plate prior to their assembly and thereafter fusing the tin plate coatings by heating the assembly to about 450° F. after assembly. This treatment is the preferred method for securing the elements together as shown in FIGURE 5 since it does not destroy the annealing of the bar 19. An alternative method for the fabrication, particularly in regard to FIGURE 6, is to employ the press fit and braze the surfaces together after their assembly. To some extent this treatment can weaken the annealed strength of bar 19 since brazing temperatures exceed the annealing temperature of this bar. Accordingly the assembly technique of FIGURE 5 is preferred.

The high efficiency and power gain of the torque motor of my invention achieves significant improvements in the operation of the servovalve herein illustrated.

The high efficiency of the torque motor permits the use of substantially more resilient spring hinge means. While copper torsion bars are satisfactory for most uses of the valve, nickel alloy steels such as Inconel X can be used to permit high temperature applications; up to about 700° to 1000° F. The low efficiency motors previously used have not developed sufficient power output at these elevated temperatures to use these alloys and therefore have been precluded from the high temperature service.

The more resilient hinge means also avoids the flutter that the prior art valves exhibit when used on high pressure lines. The flow modulating element of these valves has a tendency to flutter at the resonating frequency of the torsion bar caused by surges in the fluid pressure in the hydraulic lines when the flow from the shunt ports or orifices is altered by movement of the modulating element. The use of a high efficiency motor permits the use of larger torsion bars that have a resonance frequency substantially above the frequency of the pressure surges in the hydraulic lines. In this manner the very objectionable flutter of the prior art servovalves is avoided.

My invention therefore comprises an improved electrically actuated torque motor having sidewalls of permanent magnets and contiguous walls of ferromagnetic materials which are continuous and unpenetrated by any mechanical fasteners. The walls of the ferromagnetic materials have integral pole pieces extending therefrom in proximity to an armature to provide a high density flux path opposite the armature. The absence of the conventional screw fasteners not only avoids interruption or disturbance of the magnetic flux path but also avoids the localized stresses and strains imposed on the assembly by such screw fasteners.

My invention as applied to a hydraulic servovalve permits the construction of a valve with a resilient hinge means having a sufficient stiffness that the valve is free of the objectionable flutter that has heretofore characterized the servovalves of the prior art.

While the invention as thus described and illustrated shows a torque motor having a ratio of permanent magnet mass to ferromagnetic material mass of about 1:1, it is apparent from the preceding description that this ratio can be widely varied to maximum ratios far in excess of any attained by prior art construction. While the invention has been illustrated with specific shapes of the motor and valve, this is for illustration only and is not intended to be unduly limiting of the invention which is intended to be of sufficient scope to cover the obviously equivalent structures and shapes. My invention, therefore, is intended to be defined by the combination of elements and their obvious equivalents set forth in the following claims:

I claim:

1. An electrically actuated torque motor comprising a coil, means to apply an electromotive force to said coil, a housing surrounding said coil comprising permanent magnet opposite sidewalls, contiguous sidewalls of a ferromagnetic material mating with said permanent magnet sidewalls and extending therebetween, integral and inwardly directed radial poles at opposite ends of said contiguous sidewalls, said permanent magnet sidewalls and said contiguous ferromagnetic sidewalls being solid, continuous and unperforated walls providing an uninterrupted magnetic flux path, means surrounding said housing to retain said walls in mating relationship and to secure said housing to a base, and armature means secured to said base and extending between said poles and through said coil.

2. The torque motor of claim 1 wherein the ratio of the mass of said permanent magnet sidewalls to the mass of said contiguous sidewalls is from 5:95 to about 99:1.

3. The torque motor of claim 1 wherein the ratio of the mass of said permanent magnet sidewalls to the mass of said contiguous sidewalls is from 35:65 to about 65:35.

4. The combination of the electrically actuated torque motor of claim 1 mounted on a hydraulic servovalve having an inlet port, a return port, left and right fluid passageways through said valve comprising left and right exit ports for hydraulic fluid, left and right passageways from said inlet to said left and said right outlet ports, shunt lines extending from each of said passageways to said return port and terminating in shunt outlet ports in opposed proximity, a valve flapper extending between said shunt outlet ports and secured by resilient spring hinge means to said valve body, means connecting said flapper to said armature to permit movement of said flapper between said shunt ports by said electrically actuated torque motor.

5. The combination of claim 4 wherein said left and right fluid passageways through said valve are symmetrical and provide equal resistance to fluid flow therethrough.

6. The combination of claim 4 wherein said shunt lines comprise a longitudinal passageway in an insert having a threaded outboard end that engages a threaded tap in said valve and the proximity of the discharge ports of said shunt lines is adjustable by the advancement and retraction of said threaded insert in said valve.

7. The combination of claim 4 with a filter chamber in said valve upstream of said left and right passageways and filter means positioned therein.

8. The combination of claim 4 wherein said armature and said flapper are axially mounted on a torsion bar that comprises said resilient hinge means.

9. The combination of claim 8 wherein said torsion bar comprises a metal plate with outboard wings secured to said valve body and with reduced width flexible neck portions between said wings and said plate.

10. The combination of claim 4 with connection to hydraulic fluid lines containing hydraulic fluid at temperatures up to about 1000° F.

References Cited

UNITED STATES PATENTS

| | | | |
|---|---|---|---|
| 3,003,476 | 10/1961 | Thomas | 137—625.63 |
| 3,017,864 | 1/1962 | Atchley | 91—3 |
| 3,095,906 | 7/1963 | Kolm | 91—51 |
| 3,209,782 | 10/1965 | Wolpin | 137—625.62 |
| 3,221,760 | 12/1965 | Buchanan | 137—625.62 X |
| 3,228,423 | 1/1966 | Moog | 137—625.62 |

ALAN COHAN, *Primary Examiner.*